United States Patent Office 3,014,898
Patented Dec. 26, 1961

3,014,898
METHOD OF PREPARING SYNTHETIC RUBBER CRUMB FOR DRYING
Hans Coster, Torrance, Calif., assignor to Shell Oil Company, a corporation of Delaware
No Drawing. Filed May 27, 1959, Ser. No. 816,054
6 Claims. (Cl. 260—85.1)

The present invention relates to an improved process for preparing rubber crumb. More particularly, it relates to improvements in preparing the crumb for drying.

At the present, the standard practice in the rubber industry requires the process steps of coagulating and dewatering the rubber, washing and filtering the coagulated rubber, shredding the coagulated rubber and drying the shredded rubber. The rubber is then baled, dusted with soapstone, and packaged, if desired, before shipping or storage.

While this process is satisfactory as evidenced by the large commercial use of same, difficulties have been encountered in the drying step which have caused occasional shut-downs and which sometimes adversely affect the product. The shut-downs are usually due to deposits of rubber fines in the drier which must be cleaned out periodically, and the product sometimes contains resinified rubber and/or undried particles.

It has now been found that the above difficulties can be overcome by classifying the rubber particles, and drying only particles which are neither excessively large nor excessively small. Excessively large particles require longer drying time in order to avoid wet spots in the finished product. If the coagulated rubber is shredded until substantially all of the large particles are broken down, there is a considerable increase in the amount of excessively fine particles, and the fine particles cause even more difficulty than the large particles. Thus it is necessary to dry for a length of time sufficient to dry the largest particles.

The smaller particles which are present in the shredded coagulate tend to fall through the perforations in the dryer aprons, and circulate with the hot air. This causes fines to deposit on the steam coils and structural members of the dryer, thereby adding to dryer cleaning and maintenance cost. In addition, the particles which collect on hot members such as the steam coils tend to resinify and fall back into the product rubber. Such contamination is highly objectionable.

It is a primary object of this invention to provide a process for preparing rubber crumb in which steps are taken to avoid difficulties in the drying of the rubber. Another object of this invention is to provide a process of the above nature which is more economical and gives a more satisfactory product.

These and other objects are accomplished by a process for preparing rubber crumb from a latex emulsion comprising, coagulating the latex to form a rubber crumb, filtering the rubber crumb, shredding the rubber crumb, classifying the particles from the shredded rubber crumb, and drying a classified fraction.

In general, the invention is applicable to any type of rubber where the latex is coagulated and treated as mentioned above. The latex may be natural, synthetic or mixtures thereof. The invention has been found to be particularly useful in the manufacture of GR–S type rubbers which are primarily a copolymer of butadiene and styrene.

In accordance with a typical commercial process used in the synthetic rubber industry prior to the invention, the rubber latex was creamed with brine and coagulated with dilute sulfuric acid. The coagulated rubber is removed in the form of a crumb, and the crumb is sent to a soap conversion tank. The crumb is then dewatered on a vibrating screen and reslurried in fresh water. The fresh water slurry containing the washed rubber crumb is filtered in an Oliver filter, shredded in a Jeffery disintegrator and fed to a drier by an automatic conveyor.

In accordance with the present invention, the rubber crumb is classified after shredding and before drying. In general, any type of classifier may be used which is capable of size separation. Examples of suitable classifiers are screens and pneumatic classifiers. In its preferred form, the particles are classified by a two-level vibrating screen having an upper screen of a size large enough to allow all but the very coarse particles to pass through, and a lower screen which allows the fines to pass through. The material collected between the two screens is of the desired size for drying and is transferred to the feed end of the dryer apron. The coarse particles are recycled to the shredder. The fines may be returned to the coagulating tank or dried in a separate small drier specially suited for this purpose. Therefore, the rubber crumb is sent to the drier in the proper size without loss of material.

An alternative method of practicing the invention is accomplished by shredding the rubber crumb until all of the coarse particles are broken down and classifying out the fines only. The larger fraction is then dried, and the fines are returned to the coagulating tank. This is not considered as satisfactory as the double classification illustrated above, because a longer shredding time is required and more fines are produced.

In the prior practice, the fines have been a particularly difficult problem, because of the dusting over and contamination due to resinified fines mentioned above. Thus the shredding period was shortened to a degree that large particles were present in an amount sufficient to severely increase drying time. Even with increased drying time wet spots were often present in the dried rubber. Thus it is preferred to shred and classify the rubber to an optimum fraction just above fine size. Particles of less than 0.125 inch are considered too fine, and particles larger than 0.40 inch require excessive drying time. Thus classified particles should be within these ranges. The actual fraction selected will generally be narrower than this such as say from 0.15 to 0.30 inch depending on the shredding characteristics of the rubber. Too small a range increases the amount of material to be recycled, and too large a range increases drying time. Thus the optimum range should be determined for the particular rubber and equipment.

Uniform crumb bed thickness on the dryer apron is another important factor in rubber crumb drying. The hot air circulating through the crumb bed follows the path of least resistance. Therefore, more drying air passes through the apron areas carrying a thin crumb bed than through the sections with a thick crumb layer. Off-specification wet product sometimes results from nonuniform distribution of crumb on the dryer apron. It has been found that crumb moisture contents may be several times higher in a thick spot than in a thin spot. Thus a 10% difference in unit crumb load may result in a two-fold difference in moisture content.

The invention is illustrated more fully by the following examples:

EXAMPLES

Cold GR–S 1803 black rubber crumb is prepared by copolymerization of butadiene and styrene in aqueous emulsion at 5° C. Butadiene is treated to remove inhibitor and charged to the reactor along with catalyst which is injected at the last minute. Styrene is charged along with modifier. Soap solution containing an emulsifier (rosin soap) and a small amount of electrolyte, a sequestering agent and a dispersing agent are also charged to the reactor. In addition, an activator solution is added. For example, the total charge consists of the following ingredients in the following proportions by weight:

| | |
|---|---:|
| Butadiene | 69.36 |
| Styrene | 21.31 |
| PMHP (a mixture of 52% p-menthane hydroperoxide, 24% p-menthanols and 24% p-menthane) | 0.09 |
| Sulfole (modifier—tertiary dodecyl mercaptans) | 0.15 |
| Sodium stearate | 3.63 |
| Dresinate 515 or Nilox KNS (rosin acid soaps) | 3.26 |
| Questex 4SW (the tetrahydrate of tetrasodium-ethylenediamine tetraacetic acid) | 0.038 |
| Tamol N (condensation product of formaldehyde and sodium naphthalene sulfonate) | 0.015 |
| TPP (tripotassium phosphate) | 0.56 |
| Sodium hydrosulfite | 0.038 |
| Ferrous sulfate | 0.018 |
| Formopon or Hydro AWC (SFS; sodium formaldehyde sulfoxylate) | 0.045 |
| Soda ash | 0.004 |
| Water | 200.0 |

Minor variations in ingredients may be made depending on the water used and other factors. At 60% conversion of the monomers, a shortstop is added, which is an aqueous solution of the following ingredients:

| | |
|---|---:|
| SDD shortstop (sodium dimethyl dithiocarbamate) | 0.15 |
| Sodium polysulfide | 0.12 |
| Sodium nitrite | 0.03 |

The latex solution is then heated and the unreacted butadiene flashed off and recovered. The unreacted styrene is steam stripped, and recovered. Foaming is controlled with 0.02 part of Defoamer 4 (an esterified rosin). The stripped latex is then treated with antioxidant or stabilizer, and the oil emulsion and carbon black are added. Thus the following materials are also added:

| | |
|---|---:|
| p-Tertiary butyl catechol | 0.002 |
| BLE mixture (antioxidant) | 1.43 |
| HAF black (high abrasion furnace black) | 50.0 |
| Maraspere CB (a partially de-sulfonated sodium lignosulfonate) | 0.75 |
| Dutrex 20 (a highly aromatic oil) | 25.0 |
| Acosix or Actinol D (tall oil) | 0.46 |
| Sodium hydroxide | 0.68 |
| Dresinate 731 (sodium soaps of disproportionated rosin acids) | 0.20 |

The blended latex is then creamed with an aqueous solution of 10.0 parts sodium chloride and coagulated with 2.05 parts sulfuric acid in aqueous solution in a coagulating tank. The rubber crumbs are dewatered, filtered and shredded as mentioned above. The rubber crumb thus obtained is classified with two vibrating screens by placing the crumb on the top screen and having the screen with the larger openings on top. The upper screen allows particles of less than 0.4 inch to pass through and the lower screen allows particles of less than 0.125 inch to pass through. The coarse fraction (greater than 0.4 inch) is returned to the shredder, and the fines (less than 0.125 inch) are returned to the coagulating tank. The intermediate fraction is dried in air and after 16 minutes of drying at 190° F. less than 0.1% water remains. None of the rubber crumb dusted over in the drier, and the rubber was more uniformly dried than when crumbs having a wider range were dried.

In order to determine the effect of particle size on drying time, rubber crumb prepared according to the above example was classified and dried in a Dietert drier. The table below gives the drying time in minutes at 190° F. necessary to give certain moisture contents for different sizes of rubber crumb:

Table

| Moisture Content | 0.1-0.2 Inch Diameter | 0.2-0.4 Inch Diameter | Above 0.4 Inch Diameter | Unclassified |
|---|---|---|---|---|
| 0.3 percent | | 12 | 35 | 16 |
| 0.2 percent | 9.0 | 14 | | 19 |
| 0.1 percent | 10.0 | 16 | 40 | |

From the table, it is seen that the drying time will be less with particles between 0.125" and 0.4" than with unclassified particles. It is also apparent that in order to avoid wet spots, a drying time of about 40 minutes would be required, because the larger particles contain nearly all of the moisture in the unclassified particles. When more rapid drying time is desired, the particles from 0.125 to 0.2 or even 0.3 may be dried and the larger particles are returned quickly because they are recycled through the shredder.

The present invention is also applicable to rubbers other than that illustrated in the example above, and provides similarly improved results.

I claim as my invention:

1. A process for preparing rubber crumb from a latex emulsion comprising coagulating a latex to form a rubber crumb, filtering the rubber crumb, shredding the rubber crumb, classifying the particles of rubber in said shredded crumb by means of two vibrating screens, one of which separates the undesirably large particles having a size greater than 0.4 inch and the other of which separates the undesirably small particles having a size below 0.125 inch, drying the fraction having a particle size between 0.4 inch and 0.125 inch, recycling said undesirably small particles to the coagulating stage of the process, and recycling said undesirably large particles to the shredder.

2. A process for preparing rubber crumb from a latex emulsion comprising coagulating a latex to form a rubber crumb, filtering the rubber crumb, shredding the rubber crumb, classifying the particles of rubber in said shredded crumb by means of two vibrating screens, one of which separates the large particles having a size greater than 0.4 inch and the other of which separates the small particles having a size below 0.125 inch, and drying the fraction having a particle size between 0.4 inch and 0.125 inch.

3. The process as defined in claim 2, in which the fraction containing the smallest rubber particles is recycled to the coagulating stage of the process.

4. The process as defined in claim 2, in which the fraction containing the largest rubber particles is recycled to the shredder.

5. The process as defined in claim 2, in which the fraction containing the smallest rubber particles is dried in a separate dryer specially designed to dry small particles.

6. The process as defined in claim 2, in which the vibrating screen distributes the classified rubber particles uniformly across a dryer apron thereby improving drying efficiency.

References Cited in the file of this patent

UNITED STATES PATENTS

| 2,478,703 | Moore | Aug. 9, 1949 |
| 2,786,879 | Kennedy | Mar. 26, 1957 |

OTHER REFERENCES

Perry, J. H.: "Chemical Engineers' Handbook," pages 956–8, 3rd edition, McGraw-Hill Book Co., Inc., N.Y., 1950.